Patented Aug. 8, 1944

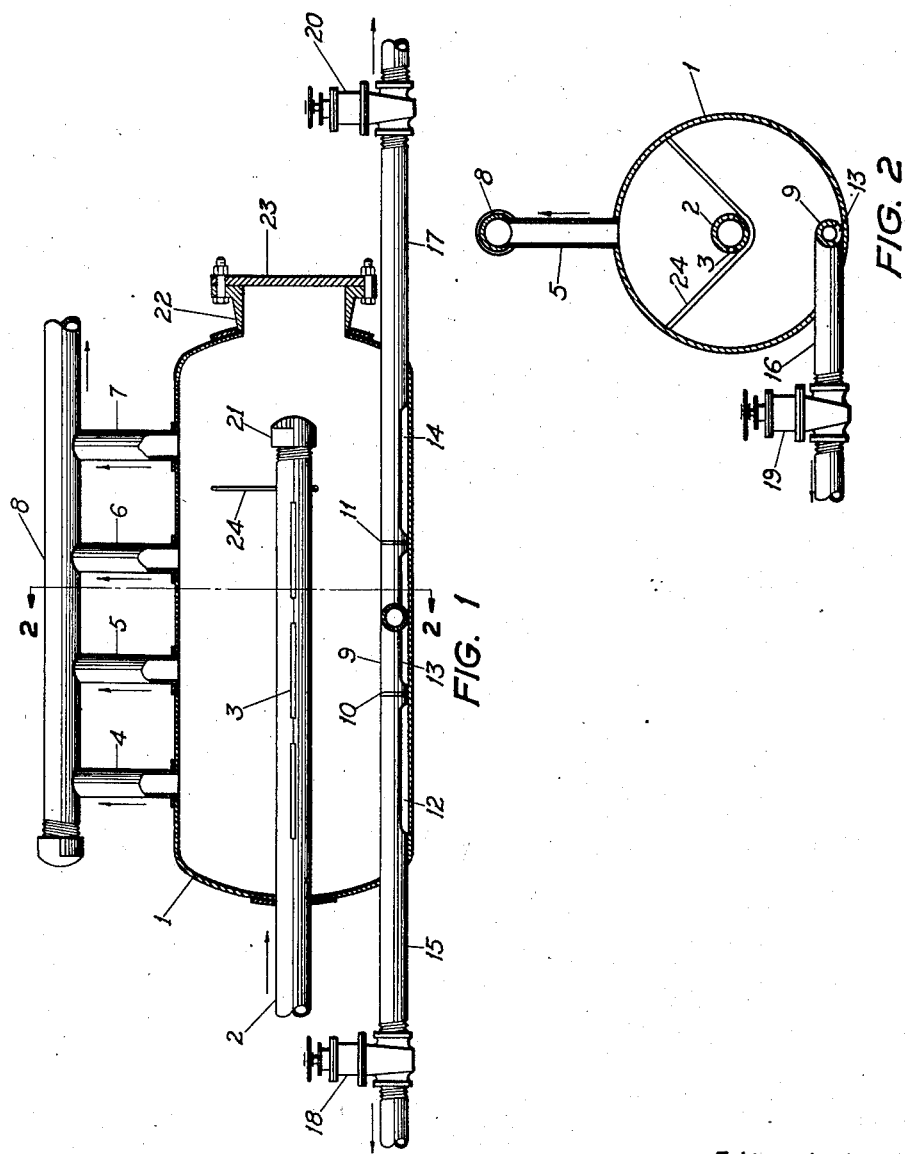

2,355,305

UNITED STATES PATENT OFFICE 2,355,305

MILL SCALE SETTLING TANK

Edgar A. Koenig, Dallas, Tex., assignor, by mesne assignments, to Socony-Vacuum Oil Company, Incorporated, New York, N. Y., a corporation of New York Application February 1, 1943, Serial No. 474,370

10 Claims. (Cl. 210—57)

This invention relates to a settling tank for the removal of suspended solids from liquids. More particularly the invention relates to a settling tank of high efficiency in the removal of solids from liquids which may be used for the clarification of liquids under pressures other than atmospheric, particularly under elevated pressures.

The settling tank, which forms the subject matter of my invention, is particularly designed for the removal of suspended solids from light hydrocarbons of relatively low viscosity and relatively high vapor pressure, such as gasoline and butane. Because of the high volatility of butane this material is transported and stored under elevated pressure to maintain it in the liquid state. Gasoline and other light hydrocarbons are also generally transported under considerable pressure through pipelines. In passage of the light hydrocarbons through pipelines, they pick up and carry along considerable portions of finely divided mill scale from the pipeline walls, and from other iron or steel equipment through which the hydrocarbons flow. The settling tank of my invention is particularly designed for the removal of this mill scale from the hydrocarbons. Obviously, the settling tank is also adapted for the removal of other suspended solids from these hydrocarbon materials, such as the various solid sorption materials which may have been added thereto to remove suspended sulphur, coloring agents or the like. Other liquids may likewise be clarified and freed from undesirable suspended solids by the use of the settling tank of my invention.

The fundamental principle underlying the use of a settling tank to remove solids from liquids, such as the mill scale from gasoline, lies in taking advantage of the difference in gravity between the solid particles and the liquid. A moving or agitated body of liquid will carry along with it a fairly constant amount of suspended solids depending principally upon the velocity of flow, the viscosity of the liquid, the density of the liquid, the density of the solid, and the particle size of the solid. For a given liquid at a substantially constant temperature and a given finely divided solid, the important variable factor becomes the velocity of flow. Assuming that there is appreciable difference in density, suspended solids may be largely removed from a rapidly flowing or agitated body of liquid by creating a zone in which the rate of flow and turbulence is very small. The application of this basic principle is important to the proper construction of a settling tank.

My invention will be illustrated by specifically referring to the design for a settling tank for the removal of mill scale from light hydrocarbons. The settling tank of my invention is adapted for many uses, however, and the invention should not be construed as limited to the use of the settling tank for any particular purpose.

It is an object of my invention to provide an economical and efficient settling tank for the removal of suspended solids from liquids.

Another object of my invention is to provide an economical and efficient settling tank for the removal of mill scale from hydrocarbon liquids under pressures above atmospheric.

Another object of my invention is to make a settling tank from which the precipitated solids may be removed as necessary without necessitating the shutting down and draining of the tank to clean out the solid material.

Another object is to make a settling tank for use in clarifying liquids transported through pipelines of such a design that the conventional mechanical pipe cleaner, "Go-devil," may be used in the pipeline, and that all the foreign material scraped from the line by the pipeline cleaner may be readily removed therefrom.

Another object of my invention is to make a settling tank for use in clarifying liquids transported through pipelines of such a design that the conventional mechanical pipeline cleaner, "Go-devil," may be used in the pipeline, and will travel into the settling tank, from whence it may be readily removed without requiring any extensive dismantling of the feed connections to the settling tank.

Other objects will be apparent from the description of my invention and from the appended claims.

My invention may be best understood by the following description of the specific design of a preferred form thereof, taken in connection with the appended drawing in which:

Figure 1 is a longitudinal cross section of the settling tank illustrating the arrangement of the inlet pipes, the outlet pipes and the sediment removal pipes, and Figure 2 is a vertical cross section taken along the line 2—2, of Figure 1.

Referring to the drawing a light hydrocarbon liquid such as gasoline, is fed into the settling tank 1 through inlet pipe 2, the inlet pipe being a continuation of the pipeline in which the hydrocarbon liquid is flowing. The settling tank may be of any suitable shape and is shown as a horizontal, substantially cylindrical vessel (Figure 1). The inlet pipe is preferably placed as shown in Figure 1 along the principal horizontal axis of the cylindrical vessel. A plurality of horizontal elongated slots 3 are provided on the opposite sides of the inlet pipe 2, and the hydrocarbon flows from the pipeline 2 through these horizontal slots 3 into the tank. The total area of these elongated slots is made at least as great as the cross sectional area of the pipeline. As a result of the relatively large area provided, the rate of flow of the hydrocarbons into the settling tank is not accelerated thereby minimizing turbulence within the settling tank itself. Also, since the inlet pipe is located at approximately the principal axis of the cylindrical vessel, it is at or near the zone where the horizontal cross sectional area of the tank is the maximum. Outlet pipes 4, 5, 6, and 7, are provided at the top of the tank for the exit of the clarified hydrocarbons. The number of outlet pipes so provided is four. Obviously a greater or lesser number of outlets may be provided. The total cross sectional area of the outlet pipes should be at least as great as that of the pipe line 2, and preferably the total area of these outflow pipes is considerably larger than that of pipe 2. A plurality of outflow pipes, uniformly distributed along the top of the tank 1, as shown, is preferred so that the flow of hydrocarbons from the tank is uniform over the entire length thereof. The various outflow pipes are connected to a common header pipe 8, which essentially is a continuation of the pipeline through which the clarified hydrocarbons flow into the metering station, pumping station, storage tank, or the like. The mill scale which settles out from suspension falls to the bottom of the tank 1. To provide for continuous operation some means must obviously be provided for the removal of this mill scale from the tank. The sediment removal pipe 9 is provided for the removal of this mill scale. This pipe extends substantially over the entire length of the tank and is positioned close to the bottom thereof. The pipe extends through both ends of the tank. The pipe 9 is divided into three sections by the plugs 10 and 11. Slots 12, 13 and 14 are provided in the underside of the pipe 9, and each slot extends throughout substantially the entire length of the sections into which the pipe is divided by the members 10 and 11. The positioning of the pipe 9 with respect to the bottom of the tank and the shape of the slots 12, 13 and 14 may be best seen in Figure 2. The opposite ends, 15 and 17 of the pipe 9 are provided with valves 18 and 20. These valves 18 and 20 are normally kept closed, and hence the settling tank may be normally maintained under the pressure existing in the pipe line 2—8. An internal connection is welded into the central section of the pipe 9, and a pipe 16, extending through the side of the tank near the bottom thereof, is connected into this section of the sediment removal pipe 9. This pipe 16 is provided with a valve 19, which is also normally kept closed, so that the liquid in the tank 1 may be maintained under the normal pressure in the pipe line.

The end of the inlet pipe 2 is externally threaded and is provided with a removable cap 21 for a purpose described later. Obviously a removable plug may be used instead of a cap, if desired. The end of the tank 1 adjacent this cap 21 is provided with a manhole 22, to which is bolted a blind flange 23. Access to the cap 22 and the inside of the tank may thus be obtained by the removal of the blind flange 23. A strap or hanger 24 welded at its ends to the inside walls of the tank supports the free end of the inlet pipe 2.

In operation, the light hydrocarbon liquid containing suspended mill scale flows from pipeline 2 into the tank 1 through the slots 3 provided in the sides of the pipeline extending into the tank. Inside of the settling tank the hydrocarbon liquids flow upwardly at a relatively slow rate to the various outlet pipes 4, 5, 6, and 7. The mill scale settles out from the slowly ascending stream of hydrocarbons, and falls to the bottom of the settling tank around and covering the pipe 9. After a time the quantity of mill scale lying above this pipe 9 will accumulate to a depth at which continued accumulation would interfere with efficient separation of the mill scale from the hydrocarbon. The mill scale may then be very simply removed by opening the valves 18, 19, and 20. Since the liquid in the tank is under considerable pressure, this liquid will try to escape through the ends 15 and 17 in pipe 9, and through pipe 16. The mill scale will therefore be forced out of these pipes after entering the various sections of pipe 9 through the elongated slots 12, 13, and 14. As soon as the liquid in the tank has a clear path to one of these slots the rate of flow from the tank through that pipe section will greatly increase. At this point substantially all of the mill scale overlying that pipe section will have been forced out ahead of the hydrocarbons, and the operator, observing the sudden increase in rate of flow will then close the valve in the pipe connected to that section of the sediment removal pipe 9. When the rate of flow has thus increased from the pipes connected to all of the various sections of the pipe 9 all of the valves will have been closed by the operator and substantially all of the mill scale will have been removed from the settling tank.

An important feature of my invention is this division of the sediment removal pipe into a plurality of sections. Were the sediment removal pipe but a single section, having a plurality of slots or openings therein, the opening of a valve connection to the outside of the tank would result in mill scale being forced out in the manner previously described. However, as soon as a clear path was available for the liquid in the tank to one of the slots the flow would then tend to entirely follow this path of least resistance, and further removal of mill scale over the remaining slots or openings would substantially cease. Continued use of the tank would merely accentuate this condition since in a subsequent cleaning operation the mill scale would be at the least depth over the opening previously entirely cleaned out, and this opening would thus be cleared even more readily with each successive operation of the tank. The mill scale would thus build up to such a depth over the remainder of the sediment removal pipe that it would approach too closely to the inlet zone where there is inevitably some turbulence. After a time this accumulated mill scale would be carried out of the tank as fast as it was entering and the sediment removal pipe would no longer function until it had been shut down and cleaned out.

While I have illustrated the settling tank as being divided into three sections, obviously a greater or lesser number may be used depending primarily upon the dimensions of the particular settling tank. An unnecessarily large number of sections merely increases the cost of the tank. Too few sections will result in inefficient and incomplete mill scale removal, and require periodic shut downs for cleaning. I prefer to design the settling tank with sufficient sections in the sediment removal pipe so that the length of each section is from one to not more than two times the distance from the sediment removal pipe to the inlet pipe. A division of the sediment removal pipe into more and shorter sections does not produce any appreciable benefit while the use of fewer and longer sections is apt to produce faulty operation and require periodic shut down. With mill scale, a section length of about three times the distance between the sediment removal pipe and the inlet pipe represents about the maximum permissible section length. With lighter solid material, particularly where such material is more free flowing and shows a lesser tendency to pack, longer sections may be satisfactorily used. With the foregoing principles in mind the proper choice of sections length for the removal of different types of solid materials will be readily apparent to those skilled in the art.

Another important feature of my invention is the simple construction of the inlet pipe. No complicated flow distributing head is necessary. By positioning the slots uniformly along the opposite sides of the inlet pipe, the flow is uniformly distributed over the entire area of the tank. The initial flow being in a horizontal direction does not tend to promote turbulence by bucking the normal direction of the flow within the tank, and, by entering the zone of maximum area, enters at a point where the velocity of flow within the tank is at a minimum. Were the flow to have a vertically upward component, it would tend to oppose the settling of the solid material. On the other hand, if the flow had a vertically downward component, it would tend to agitate and disturb the mill scale which had accumulated at the bottom of the tank.

Another advantage of the simple inlet pipe design used in my settling tank is the ease and facility with which the sediment in the pipeline removed by the conventional mechanical pipeline cleaner, commonly called "Go-devil," may be removed through the settling tank. As the pipeline cleaner approaches the settling tank the various valves in the pipes connected to the sediment removal pipe are opened, and all of the sediment ahead of the pipeline cleaner will be forced out through the sediment removal pipe at the bottom of the settling tank. The pipeline cleaner will travel into the tank through the inlet pipe 2 and come to rest against the cap 21 on the end of the inlet pipe. When the valves 18, 19, and 20 were opened for this cleaning operation, the operator previously would shut off the pipeline 8 by closing a suitable valve therein (not shown). After the pipeline cleaner has passed into the settling tank, the operator closes a suitable valve in the pipeline 2 (not shown). The pipeline 8 is provided with a vent (not shown) in the top thereof, to facilitate drainage of the tank through pipes 15, 16, and 17. The pipeline cleaner may then be readily removed by unbolting and removing the blind flange 23 and unscrewing the threaded cap 21 on the end of the inlet pipe 2. This is an important advantage for the design of my settling tank, particularly where it is used on pipelines of the character described. All of the sediment cleaned out of the pipeline by the mechanical pipeline cleaner will fall out of the slots 3 in the inlet pipe since the cleaner travels completely through the inlet pipe. Where the normal type of distributor head is used, the pipeline cleaner would be jammed against the connection to the distributor head, and the head itself would be packed with the sediment pushed ahead of the pipeline cleaner. The whole tank would have to be dismantled to remove and clean out the distributor head and to remove the pipeline cleaner.

I have illustrated and described the settling tank of my invention as being circular in cross section. While from a structural standpoint, particularly where operation of the settling tank under considerable pressure is involved, a cylindrical tank represents the simplest and most economical form of construction, a circular cross section is not essential. The only essential feature is that the bottom of the tank have an approximtae U or V shape so that the solid material will settle around and in proximity to the sediment removal pipe. Preferably the top of the settling tank will also be of an inverted U or V section so that the flow to the outlet pipes will be uniform. This is not essential, however, as several sets of outflow pipes may be provided, or but a single set as shown might be used, with the sole disadvantage that areas remote from the outlet pipes would merely be not utilized. The cross section of the tank may, for example, be oval, hexagonal, or octagonal without departing from the invention.

In the foregoing description of my invention I have primarily referred to the separation of mill scale from light hydrocarbons in a settling tank in which the liquids are under considerable pressure. With such a tank it is merely necessary that the valves 18, 19, and 20 be open and the sediment removal pipe be vented to the atmosphere. The exit end of the pipes 15, 16, and 17 will be at atmospheric pressure while the liquid in the tank will be under a pressure considerably above atmospheric. Because of this pressure difference the liquid in the tank will tend to flow out through the sediment removal pipe 9 and the pipes 15, 16, and 17. This liquid will force the accumulated mill scale out ahead of it. Where the settling tank or settler of my invention is used for the clarification of liquids at atmospheric pressure obviously a suction can be applied to the free end of the pipes 15, 16, and 17. When the valves 18, 19, and 20 are open the liquid in the tank will be at atmospheric pressure while the ends of the pipes for carrying off the sediment outside of the tank will be at a pressure less than atmospheric. Because of this pressure differential the tendency of the liquid in the tank to flow out through the pipes 15, 16, and 17 will be the same as described previously in connection with the pressure operated settling tank. The essential feature is that there be a means for providing pressure difference between the liquid inside of the tank and the end of the pipes 15, 16, and 17 outside of the tank. Whether this is done by the application of suction to the pipes or pressure to the liquid inside of the tank, or both, is a matter of choice depending upon the conditions under which the settling operations are conducted, and the amount of pressure differential necessary to force the accumulated mill scale into the slots and out of the settling tank.

If desired, the flow of liquid into the tank may be shut off for the cleaning operation. The vent in the exit pipe 8 may be opened and the head of liquid in the tank will force the mill scale out through the slots in the pipes 15, 16, and 17. If the liquid head is not sufficient, pressure may be applied through the vent connection by the use of air, an inert gas, or the fluid itself, to force the mill scale out through the slots. This procedure is particularly advantageous where the tank is operated at atmospheric or moderately elevated pressures, and the application of suction to the ends of pipes 15, 16, and 17 proves insufficient to start the flow of sediment through the slots.

Having described my invention and the preferred mode of operation thereof, what I claim is:

1. A settler for the removal of suspended solids from hydrocarbon liquids of the character described comprising a substantially cylindrical vessel having its principal axis horizontally disposed, an inlet pipe extending into said vessel and positioned intermediate the top and bottom thereof, an outlet pipe at the top of said vessel, a horizontally disposed sediment removal pipe extending along and in proximity to the bottom of said vessel, means dividing said sediment removal pipe into a plurality of sections, at least one slot in the underside of each of said sections of said last mentioned pipe, a sediment carry-off pipe connected to each section of said sediment removal pipe, and means for independently increasing the pressure differential across said sediment carry-off pipes between the vessel end and the other end thereof, whereby solids which have settled from suspension to the bottom of said vessel are forced into said sediment removal pipe and discharged through the sediment carry-off pipe.

2. A settler for the removal of mill scale from hydrocarbon liquids of the character described comprising a substantially cylindrical vessel having its principal axis horizontally disposed, a horizontal inlet pipe extending over substantially the entire horizontal length of said vessel and positioned intermediate the top and bottom thereof, a plurality of horizontal, elongated slots in the sides of said inlet pipe, at least one outlet pipe at the top of said vessel, a horizontally disposed sediment removal pipe extending along and in proximity to the bottom of said vessel, means dividing said sediment removal pipe into a plurality of sections, at least one slot in the underside of each section of said last mentioned pipe, a sediment carry-off pipe connected to each section of said sediment removal pipe, and means for independently increasing the pressure differential across said sediment carry-off pipes between the vessel end and the other end thereof whereby solids which have settled from suspension to the bottom of said vessel are forced into said sediment removal pipe and discharged through the sediment carry-off pipe.

3. A settler for the clarification of liquids from solids suspended therein comprising a substantially cylindrical vessel having its principal axis horizontally disposed, a horizontal inlet pipe extending over substantially the entire horizontal length of said vessel and positioned intermediate the top and bottom thereof, a plurality of horizontal, elongated slots in the side of said inlet pipe, at least one outlet pipe at the top of said vessel, a horizontally disposed sediment removal pipe extending along and in proximity to the bottom of said vessel, means dividing said sediment removal pipe into a plurality of sections, an elongated slot extending along substantially the entire length of each of said sections on the underside of said sediment removal pipe, a sediment carry-off pipe connected to each section of said sediment removal pipe, and means for independently increasing the pressure differential across said sediment carry-off pipes between the vessel end and the other end thereof whereby solids which have settled from suspension to the bottom of said sediment removal pipe will be discharged through said sediment carry-off pipe.

4. A settler for the clarification of liquids from solids suspended therein comprising a substantially cylindrical vessel having its principal axis horizontally disposed, a horizontal inlet pipe extending over substantially the entire length of said vessel and positioned intermediate the top and bottom thereof, a plurality of horizontal elongated slots in the sides of said inlet pipe, a plurality of vertical outlet pipes substantially uniformly distributed along the top of said vessel, the total cross sectional area of said outlet pipes being at least as great as the cross sectional area of the inlet pipe, a horizontally disposed sediment removal pipe extending along and in proximity to the bottom of said tank, means dividing said sediment removal pipe into a plurality of sections, at least one slot in the underside of each section of said last mentioned pipe, a sediment carry-off pipe connected to each section of said sediment removal pipe, and means for independently increasing the pressure differential across each sediment carry-off pipe between the vessel end and the other end thereof whereby solids which have settled from suspension to the bottom of said vessel are forced into said sediment removal pipe and discharged through the sediment carry-off pipes.

5. A settler for the removal of mill scale from hydrocarbon liquids of the character described comprising a substantially cylindrical vessel having its principal axis horizontally disposed, a horizontal inlet pipe extending over substantially the entire horizontal length of said vessel and positioned intermediate the top and bottom thereof, a plurality of horizontal, elongated slots in the side of said inlet pipe, at least one outlet pipe at the top of said vessel, a horizontally disposed sediment removal pipe extending along and in proximity to the bottom of said vessel, means dividing said sediment removal pipe into a plurality of sections, an elongated slot extending along substantially the entire length of each of said sections on the underside of said sediment removal pipe, a sediment carry-off pipe connected to each section of said sediment removal pipe, and means for independently increasing the pressure differential across said sediment carry-off pipes between the vessel end and the other end thereof whereby solids which have settled from suspension to the bottom of said sediment removal pipe will be discharged through said sediment carry-off pipe.

6. A settler for the clarification of liquids from solids suspended therein comprising a substantially cylindrical vessel having its principal axis horizontally disposed, an inlet pipe extending along said principal axis over substantially the entire horizontal length of said vessel, a plurality of horizontal elongated slots in the sides of said inlet pipe, a removable end member sealing the remote end of said inlet pipe, whereby the inflowing liquids all flow into the main body of said vessel through the horizontal slots in said inlet pipes, a plurality of vertical outlet pipes uniformly distributed along the top of said vessel, the total cross sectional areas of said outlet pipes being at least as great as the cross sectional area of the inlet pipe, a horizontally disposed sediment removal pipe extending along substantially the entire length of and in proximity to the bottom of said tank, means dividing said sediment removal pipes into a plurality of sections, slots in the underside of said last mentioned pipe extending substantially along the entire length of each of said sections, a sediment carry-off pipe connected to each section of said sediment removal pipe, and means for independently increasing the pressure differential across said sediment carry-off pipes between the vessel end and the other end thereof whereby solids which have settled from suspension to the bottom of said vessel are forced into said sediment removal pipe and discharged through the sediment carry-off pipes.

7. A settler for the removal of suspended solids of hydrocarbon liquids of the character described comprising a substantially cylindrical vessel having its principal axis horizontally disposed, an inlet pipe extending along said principal axis over substantially the entire horizontal length of said vessel, a plurality of horizontal elongated slots in the sides of said inlet pipe, the total cross sectional area of said elongated slots being at least as great as the cross sectional area of said inlet pipe, an end member sealing the remote end of said inlet pipe, whereby the inflowing liquids flow into said vessel through the slots in said inlet pipe, a plurality of vertical outlet pipes uniformly distributed along the top of said vessel, the total cross sectional area of said outflowing pipes being at least as great as the cross sectional area of the inlet pipe, a horizontally disposed sediment removal pipe extending along and in proximity to the bottom of said vessel, said sediment removal pipe being provided with at least one elongated slot in the under side thereof, a sediment carry-off pipe connected to said sediment removal pipe, and means for increasing the pressure differential across said sediment carry-off pipe between the vessel end and the other end thereof whereby solids which have settled to the bottom of said vessel are forced into said sediment removal pipe and discharged through said sediment carry-off pipe.

8. A settler for the removal of mill scale from hydrocarbon liquids of the character described comprising a substantially cylindrical vessel having its principal axis horizontally disposed, a horizontal inlet pipe extending along said principal axis over substantially the entire horizontal length of said vessel, a plurality of horizontal elongated slots in the sides of said inlet pipe, the total cross sectional area of said slots being at least as great as the cross sectional area of said inlet pipe, an end sealing member for said inlet pipe, whereby the inflowing liquids all flow through the slots in said inlet pipe, a plurality of vertical outlet pipes substantially uniformly distributed along the top of said vessel, a horizontally disposed sediment removal pipe extending along substantially the entire length of and in proximity to the bottom of said vessel, means dividing said sediment removal pipe into a plurality of sections, elongated slots in the underside of said last mentioned pipe extending along substantially the entire length of each of said sections, a sediment carry-off pipe connected to each section of said sediment removal pipe, and means for independently increasing the pressure differential across each of said sediment carry-off pipes between the vessel end and the other end thereof whereby mill scale which has settled from suspension to the bottom of said vessel is forced into said sediment removal pipe and discharged through the sediment carry-off pipes.

9. A settler for the removal of mill scale from hydrocarbon liquids of the character described, comprising a substantially cylindrical vessel having its principal axis horizontally disposed, an inlet pipe extending along said principal axis over substantially the entire horizontal length of said vessel, a plurality of horizontal elongated slots in the sides of said inlet pipe, the total cross sectional area of said elongated slots being at least as great as the cross sectional area of said inlet pipes, an end member sealing the remote end of said inlet pipe whereby the inflowing liquids flow into said vessel through the slots in said inlet pipe, at least one outlet pipe at the top of said vessel, a horizontally disposed sediment removal pipe extending along and in proximity to the bottom of said vessel, said sediment removal pipe being provided with at least one elongated slot in the underside thereof, a sediment carry-off pipe connected to said sediment removal pipe, a valve in said sediment removal pipe, and means for providing a pressure differential between the vessel end and the other end of said sediment removal pipe whereby, when said valve is open, the mill scale which has settled to the bottom of said vessel will be forced into said sediment removal pipe and discharged through said sediment carry-off pipe.

10. A settler for the removal of mill scale from hydrocarbon liquids of the character described comprising a substantially cylindrical vessel having its principal axis horizontally disposed, a horizontal inlet pipe extending over substantially the entire length of said vessel and positioned intermediate the top and bottom thereof, a plurality of horizontal elongated slots in the sides of said inlet pipe, the total cross sectional area of said slots being at least as great as the cross sectional area of said inlet pipe, an end sealing member for said inlet pipe whereby the inflowing member for said inlet pipe whereby the inflowing liquids all flow through the slots in said inlet pipe, a plurality of vertical outlet pipes substantially uniformly distributed along the top of said vessel, the total cross sectional area of said outlet pipes being at least as great as the cross sectional area of the inlet pipe, a horizontally disposed sediment removal pipe extending along substantially the entire length of and in proximity to the bottom of said vessel, means dividing said sediment removal pipe into a plurality of sections, elongated slots in the underside of said last mentioned pipe extending along substantially the entire length of each of said sections, a sediment carry-off pipe connected to each section of said sediment removal pipe, and means for independently increasing the pressure differential across each of said carry-off pipes between the vessel end and the other end thereof whereby mill scale which has settled from suspension to the bottom of said vessel is forced into said sediment removal pipe and discharged through the sediment carry-off pipes.

EDGAR A. KOENIG.